(12) United States Patent
Kim et al.

(10) Patent No.: US 11,223,396 B2
(45) Date of Patent: Jan. 11, 2022

(54) APPARATUS AND METHOD FOR TRANSMITTING AND RECEIVING INFORMATION AND POWER IN WIRELESS COMMUNICATION SYSTEM

(71) Applicant: IUCF-HYU (Industry-University Cooperation Foundation Hanyang University), Seoul (KR)

(72) Inventors: Sunwoo Kim, Seoul (KR); Minsoo Jeong, Seoul (KR)

(73) Assignee: IUCF-HYU (Industry-University Cooperation Foundation Hanyang University), Seoul (KR)

( * ) Notice: Subject to any disclaimer, the term of this patent is extended or adjusted under 35 U.S.C. 154(b) by 13 days.

(21) Appl. No.: 16/818,041

(22) Filed: Mar. 13, 2020

(65) Prior Publication Data

US 2021/0028830 A1    Jan. 28, 2021

(30) Foreign Application Priority Data

Jul. 25, 2019  (KR) .................. 10-2019-0090536

(51) Int. Cl.
*H04B 7/0426*    (2017.01)
*H04W 72/04*     (2009.01)
(Continued)

(52) U.S. Cl.
CPC ......... *H04B 7/0426* (2013.01); *H04L 5/0007* (2013.01); *H04L 5/0037* (2013.01);
(Continued)

(58) Field of Classification Search
CPC ............. H04W 72/0453; H04W 16/14; H04W 72/121; H04W 88/10; H04W 88/08;
(Continued)

(56) References Cited

U.S. PATENT DOCUMENTS

| 9,584,206 B2 | 2/2017 | Kim et al. |
| 10,003,486 B2 | 6/2018 | Zhu et al. |

(Continued)

FOREIGN PATENT DOCUMENTS

| EP | 3 370 463 A1 | 9/2018 |
| JP | 2016-187118 A | 10/2016 |

(Continued)

OTHER PUBLICATIONS

Zhenyu Xiao Joint Power Allocation and Beamforming for Non-Orthogonal Multiple Access (NOMA) in 5G Millimeter Wave Communications, IEEE Transactions on Wireless Communications, vol. 17, No. 5, May 2018.

(Continued)

*Primary Examiner* — Thai Nguyen (57) ABSTRACT

The disclosure relates to a pre-5th-generation (5G) or 5G communication system to be provided for supporting higher data rates beyond 4th-generation (4G) communication system such as long term evolution (LTE). An operation of a base station to location-based user classification and power allocation in a wireless communication system is provided. The method performed by a base station includes forming a pre-defined terminal group beam, classifying terminals into a plurality of terminal group by using location information of the plurality of terminals, received from the base station, allocating transmit (Tx) power to a terminal in a terminal group based on the location information of the plurality of terminals existing in each terminal group, and adjusting Tx power distributed to each terminal group so that an overall system communication capacity is greatest.

20 Claims, 9 Drawing Sheets

(51) Int. Cl.
*H04W 16/14* (2009.01)
*H04W 72/12* (2009.01)
*H04L 5/00* (2006.01)
*H04W 88/10* (2009.01)

(52) U.S. Cl.
CPC ....... *H04W 16/14* (2013.01); *H04W 72/0453* (2013.01); *H04W 72/121* (2013.01); *H04W 88/10* (2013.01)

(58) Field of Classification Search
CPC . H04W 8/186; H04W 52/265; H04W 52/267; H04W 52/281; H04W 52/42; H04W 52/283; H04W 16/28; H04W 72/046; H04W 72/1247; H04B 7/0617; H04B 7/0426; H04B 7/0434; H04L 5/0007; H04L 5/0037; H04L 5/0032
See application file for complete search history.

(56) References Cited

U.S. PATENT DOCUMENTS

| | | | |
|---|---|---|---|
| 10,148,332 | B2 | 12/2018 | Stirling-Gallacher et al. |
| 10,334,603 | B2 | 6/2019 | Benjebbour et al. |
| 10,389,503 | B2 | 8/2019 | Soriaga et al. |
| 2014/0314006 | A1 | 10/2014 | Suh et al. |
| 2015/0312074 | A1 | 10/2015 | Zhu et al. |
| 2016/0301511 | A1* | 10/2016 | Yoon .................. H04B 7/0626 |
| 2017/0331573 | A1 | 11/2017 | Li |
| 2019/0182816 | A1 | 6/2019 | Choe et al. |
| 2020/0053724 | A1* | 2/2020 | MolavianJazi ... H04W 72/0413 |
| 2020/0092685 | A1* | 3/2020 | Fehrenbach ......... H04B 7/2606 |

FOREIGN PATENT DOCUMENTS

| | | |
|---|---|---|
| KR | 10-2014-0125643 A | 10/2014 |
| KR | 10-2015-0043945 A | 4/2015 |
| KR | 10-2016-0124223 A | 10/2016 |
| KR | 10-2017-0001662 A | 1/2017 |
| KR | 10-2017-0073138 A | 6/2017 |
| KR | 10-2017-0109015 A | 9/2017 |
| KR | 10-2017-0128292 A | 11/2017 |
| KR | 10-2019-0067498 A | 6/2019 |
| WO | 2015/167714 A1 | 11/2015 |
| WO | 2016/188312 A1 | 12/2016 |

OTHER PUBLICATIONS

Jianjun Zhang, Codebook Design for Beam Alignment in Millimeter Wave Communication Systems, IEEE Transactions on Communications, vol. 65, No. 11, Nov. 2017.

Jingjing Cui, Optimal User Scheduling and Power Allocation for Millimeter Wave NOMA Systems, IEEE Transactions on Wireless Communications, vol. 17, No. 3, Mar. 2018.

Korean Office Action dated Aug. 12, 2020, issued in Korean Application No. 10-2019-0090536.

* cited by examiner

APPARATUS AND METHOD FOR TRANSMITTING AND RECEIVING INFORMATION AND POWER IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0090536, filed on Jul. 25, 2019, in the Korean Intellectual Property Office, the disclosure of which is incorporated by reference herein in its entirety.

BACKGROUND

1. Field

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'beyond 4G Network' or a 'post long term evolution (LTE) system'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The disclosure relates to a wireless communication system. More particularly, the disclosure relates to an apparatus and method for allocating power on the basis of location information in the wireless communication system supporting non-orthogonal multiple access.

2. Description of Related Art

Modern multi-user wireless communication systems use a multiple access method to support user communication. The multiple access method is divided into an Orthogonal Multiple Access (OMA) scheme and a Non-Orthogonal Multiple Access (NOMA) scheme. The OMA scheme supports multiple users by dividing time and frequency resources. Since each user uses an independent resource, there is no interference between the users. However, the number of users that can be supported simultaneously is restricted according to a limit of the time and frequency resources, and there is a limit in a communication capacity. In the NOMA scheme, a message is transmitted to a plurality of users in an overlapping manner. In case of using the NOMA scheme, since information is transmitted by using the same time and frequency resource, communication capacity performance may deteriorate due to interference between the users, and the communication capacity performance deterioration is aggravated with the increase in the number of users. However, since the NOMA scheme uses more time and frequency resources to perform transmission, there may be a gain in terms of the communication capacity in comparison with the OMA scheme.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for classifying terminals into a plurality of groups on the basis of a location in a wireless communication system.

Another aspect of the disclosure is to provide an apparatus and method for allocating power to a terminal by using location information of a plurality of terminals in each terminal group in a wireless communication system.

Another aspect of the disclosure is to provide an apparatus and method for adjusting transmit (Tx) power distributed to each terminal group so that an overall system communication capacity is greatest in a wireless communication system.

Additional aspects will be set forth in part in the description which follows and, in part, will be apparent from the description, or may be learned by practice of the presented embodiments.

In accordance with an aspect of the disclosure, a method of operating a base station in a wireless communication system is provided. The method includes receiving location information of terminals, determining pre-defined terminal group beams to use the terminal, classifying the terminals into a terminal group by using the location information of the terminals, allocating Tx power to an objective terminal in the terminal group and the remaining terminals except for the objective terminal in the terminal group based on the location information of the terminals, adjusting Tx power distributed to the terminal group, and transmitting the Tx power to the terminal. The objective terminal may have a top priority in Tx power allocation.

In accordance with another aspect of the disclosure, a base station in a wireless communication system is provided. The base station includes a transceiver, and at least one processor operatively coupled with the transceiver. The processor is configured to receive location information of terminals, determine pre-defined terminal group beams to use the terminal, classify the terminals into a terminal group by using the location information of the terminals, allocate Tx power to an objective terminal in the terminal group and the remaining terminals except for the objective terminal in the terminal group based on the location information of the terminals, adjust Tx power distributed to the terminal group, and transmit the determined Tx power to the terminal. The objective terminal may have a top priority in Tx power allocation.

An apparatus and method according to various embodiments of the disclosure can maximize a communication capacity of an objective terminal and reduce waste of Tx power.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinarily skill in the art will recognize that various changes and modifications of the various embodiments described herein can be made without departing from the scope and spirit of the disclosure In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure relates to a method and apparatus for location-based user classification and power allocation in a wireless communication system. In a technique described below, terminals are classified into a terminal group in a non-orthogonal multiple access system, transmit (Tx) power is allocated to corresponding terminals, and Tx power for each terminal group is adjusted.

Terms used hereinafter to refer to a signal, a channel, control information, network entities, a component of a device, or the like are exemplified for convenience of explanation. Therefore, the disclosure is not limited to the terms described below, and thus other terms have the same technical meaning may also be used.

Figure 1:
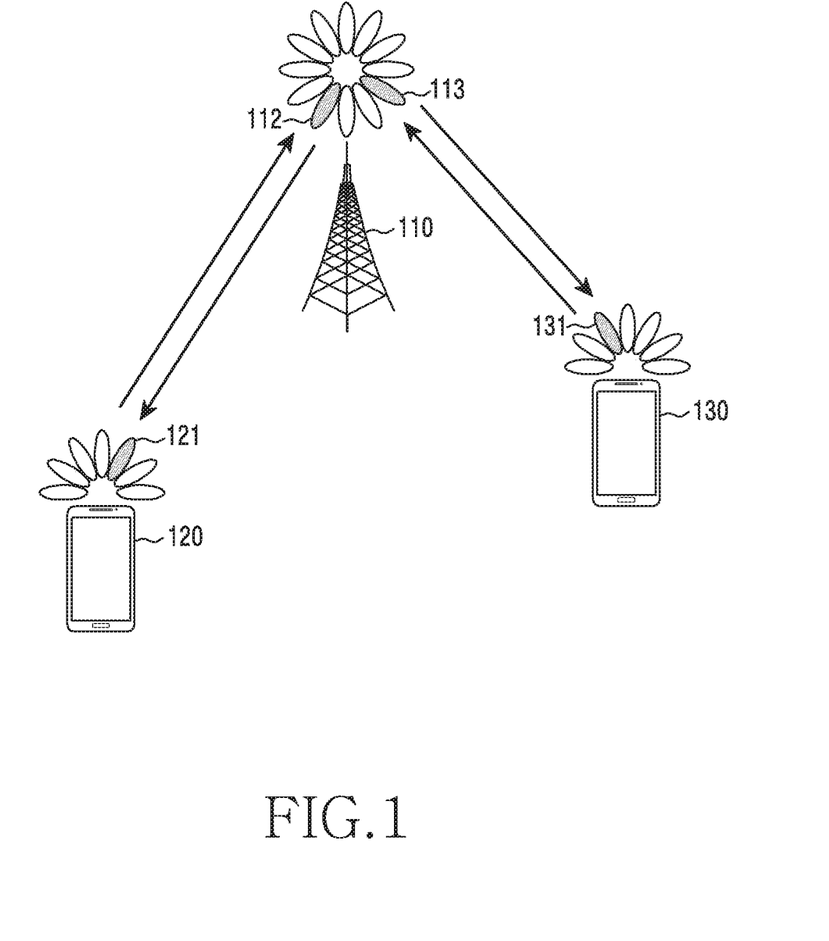
FIG. 1 illustrates a wireless communication system according to an embodiment of the disclosure.

FIG. 1 illustrates a wireless communication system according to an embodiment of the disclosure.

Referring to FIG. 1, as part of nodes which use a wireless channel in a wireless communication system, a base station 110, a terminal 120, and a terminal 130 are illustrated in FIG. 1. Although only one base station is illustrated in FIG. 1, another base station identical to or different from the base station 110 may be further included.

The base station 110 is a network infrastructure which provides a radio access to the terminals 120 to 130. The base station 110 has a coverage defined as a specific geographic region on the basis of a distance in which a signal can be transmitted. In addition to the term 'base station', the base station 110 may be referred to as an 'Access Point (AP)', an 'eNodeB (eNB)', a '5th Generation (5G) node', a 'next generation nodeB (gNB)', a 'wireless point', a 'Transmission/Reception Point (TRP)', or other terms having equivalent technical meanings.

As a device used by a user, each of the terminals 120 to 130 communicates with the base station 110 through the wireless channel Optionally, at least one of the terminals 120 to 130 may be operated without user involvement. As a device for performing Machine Type Communication (MTC), at least one of the terminals 120 to 130 may not be carried by the user. In addition to the term 'terminal', each of the terminals 120 to 130 may be referred to as a 'User Equipment (UE)', a 'mobile station', a 'subscriber station', a 'remote terminal', a 'wireless terminal', a 'user device', or other terms having equivalent technical meanings.

The base station 110, the terminal 120, and the terminal 130 may transmit and receive a radio signal at a millimeter Wave (mmWave) band (e.g., 28 GHz, 30 GHz, 38 GHz, 60 GHz). In this case, to improve a channel gain, the base station 110, the terminal 120, and the terminal 130 may perform beamforming. The beamforming may include transmission beamforming and reception beamforming That is, the base station 110, the terminal 120, and the terminal 130 may assign a directivity to a transmission signal and or a reception signal. For this, the base station 110 and the terminals 120 and 130 may select serving beams 112, 113, 121, and 131 through a beam search or beam management procedure. After the serving beams 112, 113, 121, and 131 are selected, subsequent communication may be performed through a resource having a Quasi Co-Located (QCL) relation with a resource used to transmit the serving beams 112, 113, 121, and 131.

If large-scale characteristics of a channel which has delivered a symbol on a first antenna port can be inferred from a channel which has delivered a symbol on a second antenna port, it may be evaluated that the first antenna port and the second antenna port have the QCL relation. For example, the large-scale characteristics may include at least one of a delay spread, a Doppler spread, a Doppler shift, an average gain, an average delay, and a spatial receiver parameter.

Figure 2:
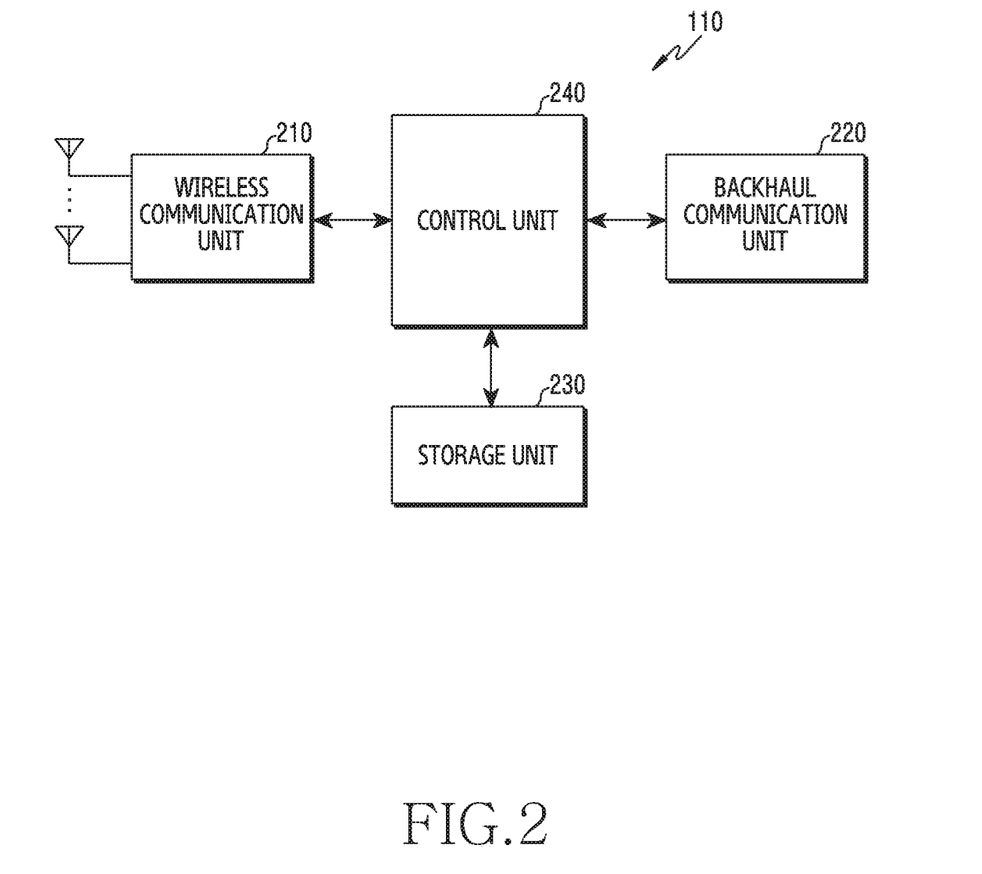
FIG. 2 illustrates a structure of a base station in a wireless communication system according to an embodiment of the disclosure.

FIG. 2 illustrates a structure of a base station in a wireless communication system according to an embodiment of the disclosure. The structure of FIG. 2 may be understood as a structure of the first base station 110. Hereinafter, the term ' . . . unit', ' . . . device', or the like implies a unit of processing at least one function or operation, and may be implemented in hardware or software or in combination of the hardware and the software.

Referring to FIG. 2, the base station 110 includes a wireless communication unit 210, a backhaul communication unit 220, a storage unit 230, and a control unit 240.

The wireless communication unit 210 performs functions for transmitting and receiving a signal through a wireless channel. For example, the wireless communication unit 210 performs a function of conversion between a baseband signal and a bit-stream according to a physical layer standard of a system. In data transmission, the wireless communication unit 210 may generate complex symbols by coding and modulating a transmission bit-stream. In addition, in data reception, the wireless communication unit 210 restores a reception bit-stream by demodulating and decoding a baseband signal.

The wireless communication unit 210 also up-converts a baseband signal into a Radio Frequency (RF) signal and thereafter transmits it through an antenna, and down-converts an RF signal received through the antenna into a baseband signal. The wireless communication unit 210 may include a transmission filter, a reception filter, an amplifier, a mixer, an oscillator, a Digital to Analog Converter (DAC), an Analog to Digital Converter (ADC), or the like. In addition, the wireless communication unit 210 may include a plurality of transmission/reception paths. The wireless communication unit 210 may include at least one antenna array constructed of a plurality of antenna elements.

From a hardware aspect, the wireless communication unit 210 may be constructed of a digital unit and an analog unit, and the analog unit may be constructed of a plurality of sub-units according to operating power, operation frequency, or the like. The digital unit may be implemented with at least one processor (e.g., a Digital Signal Processor (DSP)).

The wireless communication unit 210 transmits and receives a signal as described above. Accordingly, the wireless communication unit 210 may be referred to as a transmitter, a receiver, or a transceiver. In addition, in the following description, transmission and reception performed through a wireless channel are used to imply that the aforementioned processing is performed by the wireless communication unit 210.

The backhaul communication unit 220 provides an interface for preforming communication with different nodes in a network. The backhaul communication unit 220 converts a bit-stream transmitted from the base station to a different node, e.g., a different access node, a different base station, an upper node, a core network, or the like, into a physical signal, and converts a physical signal received from the different node into a bit-stream.

The storage unit 230 stores data such as a basic program, application program, configuration information, or the like for an operation of the base station. The storage unit 230 may be constructed of a volatile memory, a non-volatile memory, or a combination of the volatile memory and the non-volatile memory. In addition, the storage unit 230 provides the stored data according to a request of the control unit 240.

The control unit 240 controls overall operations of the base station. For example, the control unit 240 may transmit and receive a signal via the wireless communication unit 210 or the backhaul communication unit 220. In addition, the control unit 240 writes data to the storage unit 230, and reads the data. Further, the control unit 240 may perform functions of a protocol stack required in a communication standard. According to another implementation, the protocol stack may be included in the wireless communication unit 210. For this, the control unit 240 may include at least one processor.

The control unit 240 may receive location information from each terminal to classify terminals into a terminal group, allocate Tx power to a terminal in the terminal group, and adjust Tx power distributed to the terminal group. For example, the control unit 240 may control the base station to perform operations according to various embodiments described below.

Figure 3:
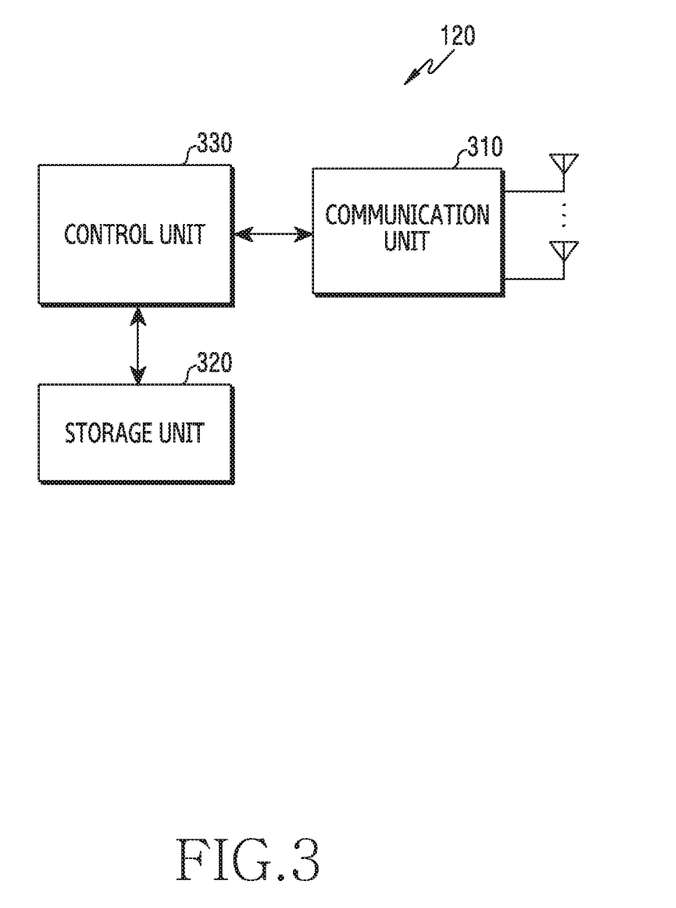
FIG. 3 illustrates a structure of a terminal in a wireless communication system according to an embodiment of the disclosure.

FIG. 3 illustrates a structure of a terminal in a wireless communication system according to an embodiment of the disclosure.

The structure of FIG. 3 may be understood as a structure of the terminal 120. Hereinafter, the term ' . . . unit', ' . . . device', or the like implies a unit of processing at least one function or operation, and may be implemented in hardware or software or in combination of the hardware and the software.

Referring to FIG. 3, the terminal includes a communication unit 310, a storage unit 320, and a control unit 330.

The communication unit 310 performs functions for transmitting and receiving a signal through a wireless channel. For example, the communication unit 310 performs a function of conversion between a baseband signal and a bit-stream according to a physical layer standard of a system. In data transmission, the communication unit 310 generates complex symbols by coding and modulating a transmission bit-stream. In data reception, the communication unit 310 restores a reception bit-stream by demodulating and decoding a baseband signal. The communication unit 310 up-converts a baseband signal into a Radio Frequency (RF) signal and thereafter transmits it through an antenna, and down-converts an RF signal received through the antenna into a baseband signal. For example, the communication unit 310 may include a transmission filter, a reception filter, an amplifier, a mixer, an oscillator, a DAC, an ADC, or the like.

The communication unit 310 may include a plurality of transmission/reception paths. Further, the communication unit 310 may include at least one antenna array constructed of a plurality of antenna elements. From a hardware aspect, the communication unit 310 may be constructed of a digital circuit and an analog circuit (e.g., a Radio Frequency Integrated Circuit (RFIC)). The digital and the analog circuit may be implemented as one package. In addition, the communication unit 310 may include a plurality of RF chains. Further, the communication unit 310 may perform beamforming.

The communication unit 310 transmits and receives a signal as described above. Accordingly, the communication unit 310 may be referred to as a transmitter, a receiver, or a transceiver. In addition, in the following description, transmission and reception performed through a wireless channel are used to imply that the aforementioned processing is performed by the communication unit 310.

The storage unit 320 stores data such as a basic program, application program, configuration information, or the like for an operation of the terminal. The storage unit 320 may be constructed of a volatile memory, a non-volatile memory, or a combination of the volatile memory and the non-volatile memory. In addition, the storage unit 320 provides the stored data according to a request of the control unit 330.

The control unit 330 controls overall operations of the terminal. For example, the control unit 330 may transmit and receive a signal via the communication unit 310. The control unit 330 writes data to the storage unit 320, and reads the data. The control unit 330 may perform functions of a protocol stack required in a communication standard. For this, the control unit 330 may include at least one processor or micro-processor, or may be part of the processor. Part of the communication unit 310 and the control unit 330 may be referred to as a Communication Processor (CP). The control unit 330 may control the terminal to perform operations according to various embodiments described below.

Figure 4:
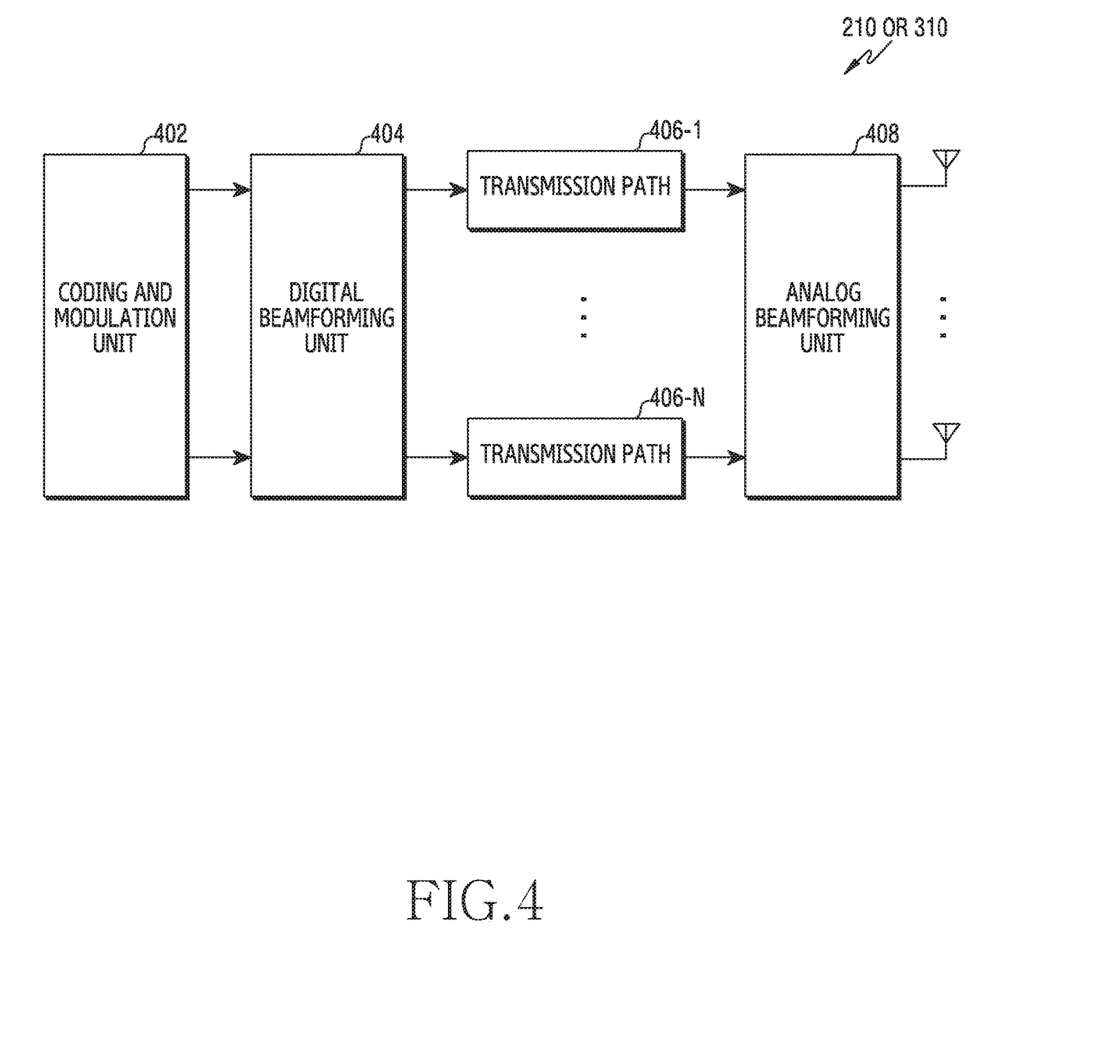
FIG. 4 illustrates a structure of a communication unit in a wireless communication system according to an embodiment of the disclosure.

FIG. 4 illustrates a structure of a communication unit in a wireless communication system according to an embodiment of the disclosure.

An example for a detailed structure of the wireless communication unit 210 of FIG. 2 or the communication unit 310 of FIG. 3 is illustrated in FIG. 4. Specifically, components for performing beamforming are exemplified in FIG. 4, as part of the wireless communication unit 210 of FIG. 2 or the communication unit 310 of FIG. 3.

Referring to FIG. 4, the wireless communication unit 210 or the communication unit 310 includes a coding and modulation unit 402, a digital beamforming unit 404, a plurality of transmission paths 406-1 to 406-N, and an analog beamforming unit 408.

The coding and modulation unit 402 performs channel encoding. For the channel encoding, at least one of a Low Density Parity Check (LDPC) code, a convolution code, and a polar code may be used. The coding and modulation unit 402 generates modulation symbols by performing constellation mapping.

The digital beamforming unit 404 performs beamforming on a digital signal (e.g., modulation symbols). The digital beamforming unit 404 multiplies the modulation symbols by beamforming weights. The beamforming weights are used to change a magnitude and phase of a signal, and may be referred to as a 'precoding matrix', a 'precoder', or the like. The digital beamforming unit 404 outputs modulation symbols subjected to digital beamforming to the plurality of transmission paths 406-1 to 406-N. In this case, according to a Multiple Input Multiple Output (MIMO) transmission scheme, the modulation symbols may be multiplexed, or the same modulation symbols may be provided to the plurality of transmission paths 406-1 to 406-N.

The plurality of transmission paths 406-1 to 406-N convert the digital signals subjected to digital beamforming into an analog signal. Each of the plurality of transmission paths 406-1 to 406-N may include an Inverse Fast Fourier Transform (IFFT) calculation unit, a Cyclic Prefix (CP) inserting unit, a DAC, an up-conversion unit. The CP inserting unit is for an Orthogonal Frequency Division Multiplexing (OFDM) scheme, and may be excluded when a different physical layer scheme (e.g., Filter Bank Multi-Carrier (FBMC)) is applied. The plurality of transmission paths 406-1 to 406-N provide an independent signal processing process for a plurality of streams generated through digital beamforming. However, according to an implementation scheme, some of components of the plurality of transmission paths 406-1 to 406-N may be commonly used.

The analog beamforming unit 408 performs beamforming on an analog signal. The analog beamforming unit 408 multiplies the analog signals by beamforming weights. The beamforming weights are used to change a magnitude and phase of a signal. According to a connection structure between the plurality of transmission paths 406-1 to 406-N and antennas, the analog beamforming unit 408 may be configured in various manners. For example, each of the plurality of transmission paths 406-1 to 406-N may be coupled with one antenna array. For another example, the plurality of transmission paths 406-1 to 406-N may be coupled with one antenna array. For another example, the plurality of transmission paths 406-1 to 406-N may be adaptively coupled with one antenna array or coupled with two or more antenna arrays.

Figure 5:
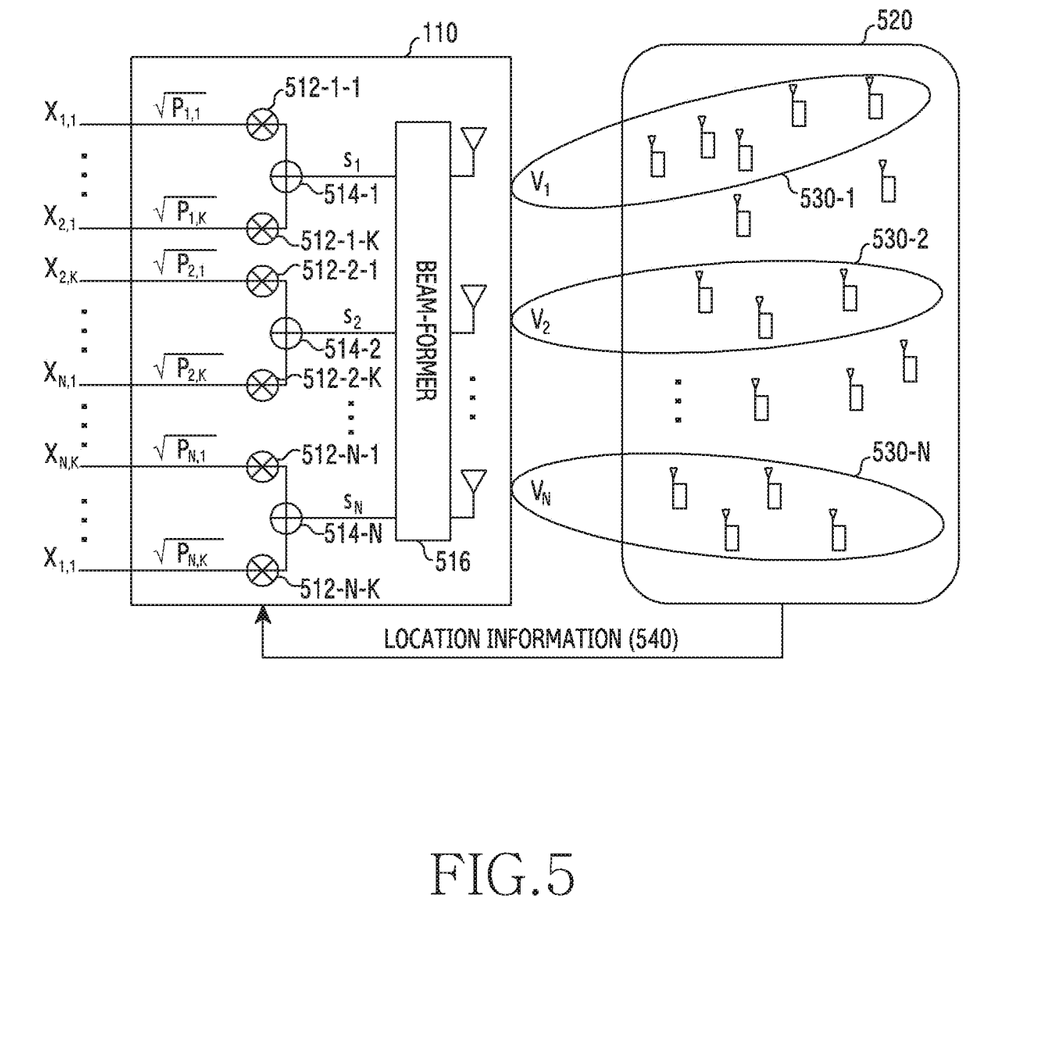
FIG. 5 briefly illustrates downlink data transmission in a wireless communication system according to an embodiment of the disclosure.

FIG. 5 briefly illustrates downlink data transmission in a wireless communication system according to an embodiment of the disclosure.

Referring to FIG. 5, the base station 110 includes multipliers 512-1-1 to 512-1-K, adders 514-1 to 514-N, and a beam-former 516.

Each of the multipliers 512-N-1 to 512-N-K multiplies a data signal by a power value. The multipliers 512-1-1 to 512-1-K apply power allocated to a terminal to the data signal. Each of the adders 514-1 to 514-N adds data signals, to which power is allocated, for each terminal group. The adders 514-1 to 514-N generate a Tx signal for each terminal group. The beam-former 516 forms beams 530-1 to 530-N. Each of the beams 530-1 to 530-N corresponds to one terminal group.

The base station 110 may receive location information 540 from terminals, and may classify terminals 520 into N terminal groups by using the location information. A case where K terminals are included in one terminal group is exemplified in FIG. 5. However, according to another embodiment, the number of terminals for each terminal group may be different. A signal for a terminal k belonging to a terminal group i has a value obtained by multiplying data (e.g., a message) of the terminal and Tx power by means of the multipliers 512-2-1 to 512-2-K and 512-N-1 to 512-N-K. Accordingly, an overlapping signal $s_i$ has a value obtained by overlapping signals processed by the multipliers 512-N-1 to 512-N-K by means of the adders 514-1 to 514-N, for all K terminals belonging to the terminal group i. The determined overlapping signal $s_i$ is transmitted through beams formed by the beam-former 516.

In an environment where a signal is transmitted for each terminal group as shown in FIG. 5, if Tx power of the base station is denoted by $P_t$, then Tx power $P_i$ distributed to N terminal groups may be determined as shown in Equation 1.

$$P_t = \Sigma_i^N P_i \qquad \text{Equation 1}$$

In Equation 1, $P_t$ denotes Tx power of the base station, N denotes the number of terminal groups, and $P_i$ denotes Tx power distributed to the terminal group. Total Tx power may be expressed by a sum of Tx power distributed to each terminal group.

A signal $s_i$ transmitted to each terminal group may be determined as shown in Equation 2.

$$s_i = \Sigma_{k=1}^K \sqrt{p_{i,k}} x_{i,k} \qquad \text{Equation 2}$$

In Equation 2, $s_i$ denotes an overlapping signal transmitted to each terminal group, $p_{i,k}$ denotes Tx power for the terminal k belonging to the group i, and $x_{i,k}$ denotes a message of the terminal k belonging to the group i. $s_i$ may be expressed in a form of adding a message transferred to K terminals in the terminal group i. In conclusion, a signal $y_{i,k}$ received by the terminal k of the terminal group i may be determined as shown in equation (3).

$$y_{i,k} = h_{i,k}{}^H v_i s_i + h_{i,k}{}^H \Sigma_{n=1, n \neq i}{}^K v_n s_n + n_{i,k} \qquad \text{Equation 3}$$

In Equation 3, $y_{i,k}$ denotes a signal received by the terminal k belonging to the terminal group i, $h_{i,k}{}^H$ denotes a channel between the base station and the terminal k belonging to the terminal group i, $v_i$ is a Tx beamforming vector, $s_i$ denotes an overlapping signal transmitted to each terminal group, and $n_{i,k}$ denotes a white noise received by the terminal k belonging to the terminal group i.

A method of distributing the power $p_i$ by using the location information 540 of the base station and K terminals in each terminal group so that a communication capacity of an objective terminal is greatest while maintaining QoS in each terminal group may be determined through Equation 4.

$$p_i = \Sigma_{i,k=1}{}^K p_{i,k} \qquad \text{Equation 4}$$

In Equation 4, $p_i$ denotes Tx power distributed to N terminal groups, and $p_{i,k}$ denotes Tx power for the terminal k belonging to the terminal group i.

The base station re-adjusts Tx power distributed to each terminal group so that an overall system communication capacity is greatest, on the basis of a communication capacity of a terminal group when power of $p_t/N$ is distributed to each terminal group.

Figure 6:
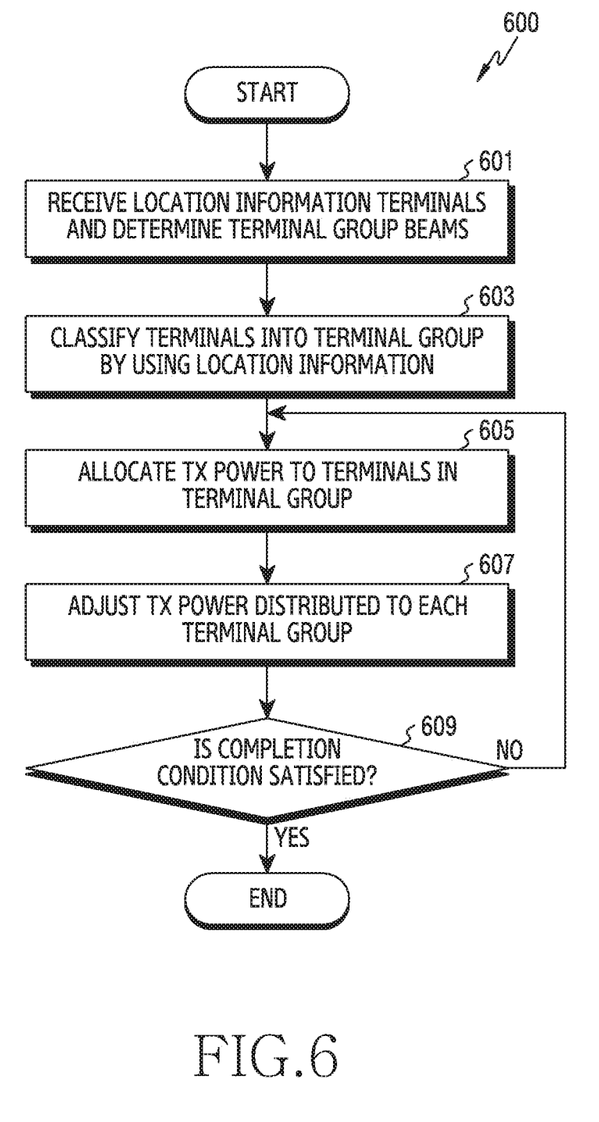
FIG. 6 illustrates a flowchart for power allocation of a base station in a wireless communication system according to an embodiment of the disclosure.

FIG. 6 illustrates a flowchart for power allocation of a base station in a wireless communication system according to an embodiment of the disclosure. A method of operating the base station 110 is exemplified in FIG. 6.

Referring to FIG. 6, in operation 601, a base station receives location information of terminals and determines terminal group beams. The base station receives, from the terminals, location information transmitted by the terminals. In addition, the base station determines predefined terminal group beams to classify the terminals into a terminal group.

In operation 603, the base station classifies the terminals to the terminal group by using the location information. The base station may classify the terminals to each terminal group in such a manner that a value in which a difference of the angles is smallest is determined by comparing an angle which is one of location information of the terminals is compared with an angle of the predefined terminal group beam.

In operation 605, the base station allocates Tx power to the terminals in the terminal group. The base station may allocate Tx power by considering a priority between the terminals included in the terminal group. A terminal with a top priority in one group is referred to as a 'objective terminal'. For example, the base station may allocate Tx power to the terminals so that relatively large power is allocated to the objective terminal. When this operation 605 is performed first, it may be a state in which Tx power for each terminal group is uniformly distributed.

In operation 607, the base station adjusts Tx power distributed to each terminal group. The base station distributes total Tx power of the base station to each terminal group on the basis of a sum of channel capacities between the terminal groups. For example, the base station may adjust Tx power for each terminal group to maximize the sum of the overall channel capacities.

In operation 609, the base station determines whether a completion condition of Tx power allocation is satisfied. If the completion condition is not satisfied, the base station may repeat operations 605 and 607. Herein, the completion condition may be defined variously. Otherwise, if the completion condition is satisfied, the base station ends the power allocation procedure.

Thereafter, although not shown in FIG. 6, the base station may transmit a data signal to terminals according to the allocated Tx power. The base station may apply Tx power to a data signal for each terminal, may add the data signals for each terminal group, and thereafter may transmit the data signals through a plurality of beams.

In the embodiment described with reference to FIG. 6, the base station classifies the terminals. The terminal groups correspond to beams formed in the base station. One terminal group may be understood as a set of terminals served through one beam. In this case, a beam for each terminal group may be determined as follows.

First, the base station may determine terminal group beams through Equation 5.

$$\phi_i = \arccos\left(1 - \frac{2(i-1)}{N-1}\right), \text{ for } i = 1, 2, \ldots, N \qquad \text{Equation 5}$$

In Equation 5, $\phi_i$ may denote an angle of an orthogonal terminal group beam, i may denote a natural number used to divide terminals into N terminal groups, and arccos(x) may be determined within a range of 0 to $\pi$. The base station determines an orthogonal terminal group beam based on a codebook, by using the angle of the orthogonal terminal group beam based on the Equation 5 above. A Tx codebook may be determined according to Equation 6.

$$V = |v_1, \ldots, v_N| \qquad \text{Equation 6}$$

In Equation 6, V may denote a Tx codebook, and $v_1, \ldots, v_N$ may denote Tx beamforming vectors.

The base station calculates a distance $d_k$ between the terminal and the base station and an angle $\theta_k$ between the terminal and the base station by using the received terminal's location information, and then classifies the terminal into each terminal group generated based on a codebook. The distance $d_k$ between the base station and the terminal may be determined as shown in Equation 7.

$$d_k = \sqrt{(x_{BS} - x_k)^2 + (y_{BS} - y_k)^2} \qquad \text{Equation 7}$$

In Equation 7, $d_k$ denotes a distance between the base station and the terminal k, $x_{BS} - x_k$ denotes a distance between the base station and the terminal k on an x-axis, and $y_{BS} - y_k$ denotes a distance between the base station and the terminal k on a y-axis.

The angle $\theta_k$ between the terminal and the base station may be determined as shown in Equation 8.

$$\theta_k = \frac{\pi}{2} - \arctan\left(\frac{x_k - x_{BS}}{y_k - y_{BS}}\right) \qquad \text{Equation 8}$$

In Equation 8, $\theta_k$ denotes an angle between the base station and the terminal k, $x_{BS} - x_k$ denotes a distance between the base station and the terminal k on an axis-X, and $y_{BS} - y_k$ denotes a distance between the base station and the terminal k on a y-axis.

The base station may classify the terminals into each terminal group on the basis of the Tx codebook and angle of the terminal group beam, obtained as shown in Equation 5 and Equation 6, and angle information and distance information between the base station and the terminal, obtained as shown in Equation 7 and Equation 8. A method of classifying the terminals into each terminal group may be determined through Equation 9.

$$v_i = \arg\min_{v \in \mathcal{V}} \|v - a(\theta_k)\|_F^2 \text{ for } i = 1, 2, \ldots, N. \qquad \text{Equation 9}$$

In Equation 9, $\theta_k$ denotes an angle between the base station and the terminal k, $v_i$ denotes an angle of an orthogonal terminal group beam, V denotes a Tx codebook, and $v_i$ denotes a Tx beamforming vector. $\|A\|_F$ denotes a Euclidean norm of a vector in the presence of a matrix A.

The base station obtains a value in which the angle $v_1$ and the angle $\theta_k$ are smallest to classify each of the terminals into a terminal group in which a difference of the angles is smallest.

Figure 7:
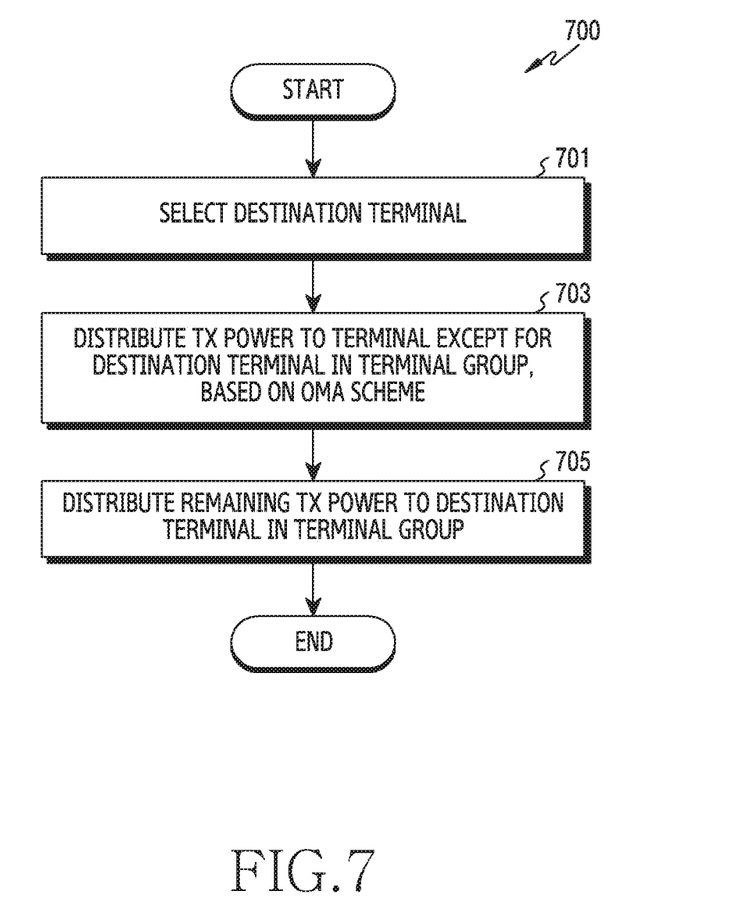
FIG. 7 illustrates a flowchart for allocating power to terminals in a terminal group in a wireless communication system according to an embodiment of the disclosure.

FIG. 7 illustrates a flowchart 700 for allocating power to terminals in a terminal group in a wireless communication system according to an embodiment of the disclosure. A method of operating the base station 110 is exemplified in FIG. 7.

Referring to FIG. 7, in operation 701, a base station selects an objective terminal. The objective terminal may be a terminal with a top priority of power allocation in a corresponding terminal group. K terminals in the terminal group are classified into the objective terminal and the remaining (K−1) terminals except for the objective terminal. The objective terminal may be determined based on any one of various policies. That is, the base station may identify the objective terminal among terminals in the terminal group according to a predefined criterion.

In operation 703, the base station distributes Tx power to terminals except for the objective terminal in the terminal group on the basis of an Orthogonal Multiple Access (OMA) scheme. Specifically, the base station uses distance information with respect to the terminals to distribute Tx power, to the remaining terminals except for the objective terminal in the terminal group, by 1/K times the channel capacity to be satisfied when the Tx power is distributed using the OMA scheme. As an unlimited embodiment, in case of the remaining terminals other than the objective terminal, all terminals have the same communication capacity if Tx power is distributed based on a terminal farthest in distance from the base station (a terminal with a worst channel state) when the Tx power is distributed using the OMA scheme.

In operation 705, the base station distributes the remaining Tx power to the objective terminal in the terminal group. The base station distributes Tx power to the remaining terminals except for the objective terminal in the terminal group including the objective terminal, and allocates the remaining Tx power to the objective terminal. The Tx power distributed to the objective terminal has the remaining Tx power having a magnitude obtained by adding the remaining Tx power to the same Tx power as the Tx power distributed to one of the remaining terminals except for the objective terminal. The remaining Tx power is greater than Tx power of one of the remaining terminals except for the objective terminal.

In the embodiment described with reference to FIG. 7, the base station selects the objective terminal. The objective terminal may be defined according to the following policy.

For example, the objective terminal may be selected according to a payment plan or a customer's rating. The objective terminal may be determined according to a user's rating determined by a contract between a network operator and a user, a payment plan, or communication traffic.

The objective terminal may be selected according to a service feature. For example, if a high throughput is required or if a service requiring a low latency is used, a corresponding terminal may be selected as the objective terminal.

The objective terminal may be selected according to a request of the terminal. For example, if the terminal transmits a request requiring allocation of high Tx power and the base station approves this, the terminal may be selected as the objective terminal.

In the embodiment described with reference to FIG. 7, the base station allocates power by considering the objective terminal. A detailed operation of allocating power to terminals in a terminal group will be described as follows with reference to equations.

When an objective terminal is selected, K terminals in a terminal group i may be classified into the objective terminal (primary user) and the remaining (K-1) terminals except for the objective terminal in the terminal group. Tx power distributed to the remaining terminals other than the objective terminal in the terminal group may be determined as shown in Equation 10.

$$p_{i,k \neq pu} = \frac{\left(1 + \frac{p_i |h_{i,k}^H v_i|^2}{\sigma^2}\right)^{1/K} - 1}{\frac{|h_{i,k}^H v_i|^2}{\sum_{m \neq k}^{K} p_{i,m} |h_{i,k}^H v_i|^2 + \sum_{n \neq i}^{K} p_{n,k} |h_{i,k}^H v_n|^2 + \sigma^2}} \qquad \text{Equation 10}$$

In Equation 10, $p_{i,k \neq Pu}$ denotes Tx power for a terminal k belonging to a terminal group i, $p_i$ denotes Tx power distributed to the terminal group, $h_{i,k}^H$ denotes a channel between the base station and the terminal k of the terminal group i, $v_i$ denotes a Tx beamforming vector, and $\sigma^2$ denotes noise power.

According to Equation 10 above, Tx power distributed to the remaining terminals other than the objective terminal is 1/K times the channel capacity to be satisfied when Tx power is distributed using an OMA scheme on the basis of a terminal farthest in distance from the base station.

A method of distributing power to (K−1) terminals except for the objective terminal and thereafter additionally distributing the remaining power to the objective terminal may be determined through Equation 1).

$$p_{i,1} = p_i - \Sigma_{k=1}^{K} p_{i,k} \qquad \text{Equation 11}$$

In Equation (11), $p_{i,1}$ denotes Tx power for a objective terminal belonging to the terminal group i, $p_i$ denotes Tx power distributed to the terminal group, and $p_{i,k}$ denotes Tx power for the terminal k belonging to the terminal group i.

Figure 8:
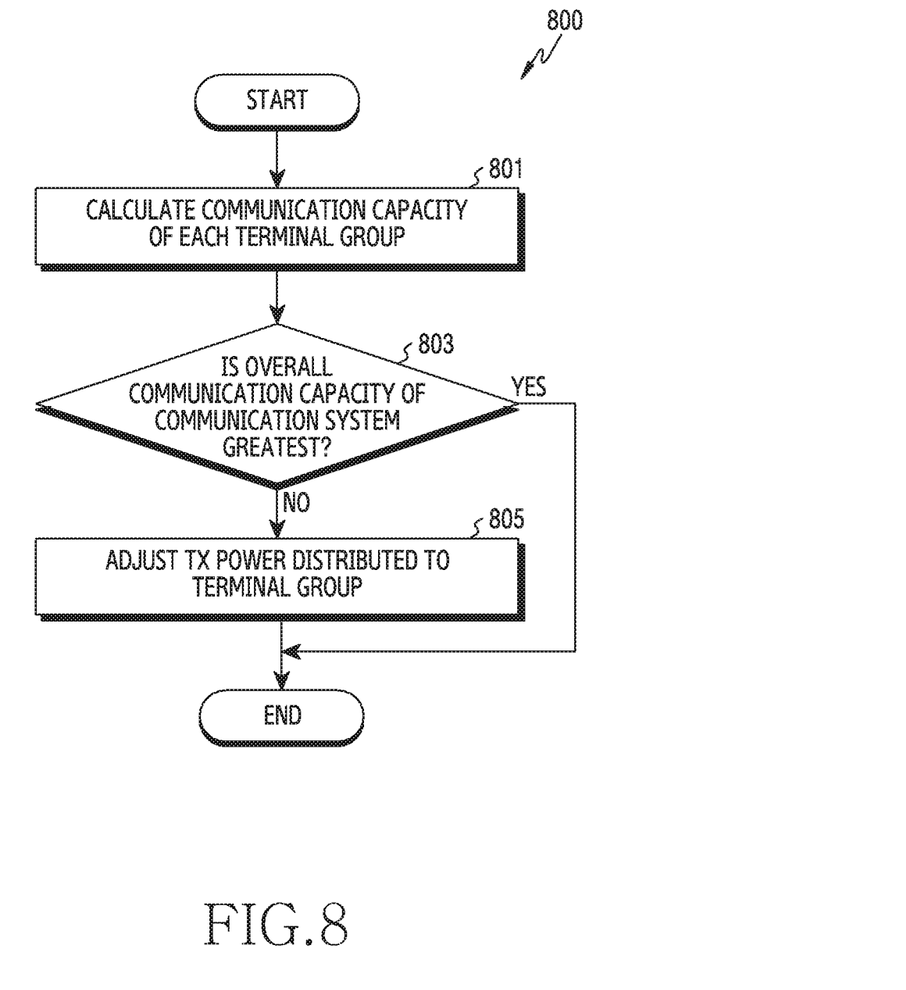
FIG. 8 illustrates a flowchart for adjusting transmit (Tx) power distributed to a terminal group in a wireless communication system according to an embodiment of the disclosure.

FIG. 8 illustrates a flowchart for adjusting Tx power distributed to a terminal group in a wireless communication system according to an embodiment of the disclosure. A method of operating the base station 110 is exemplified in FIG. 8.

A procedure exemplified in FIG. 8 is for adjusting Tx power distributed to each terminal group so that an overall system communication capacity is greatest, after Tx power is distributed to each terminal according to the procedure of FIG. 7.

Referring to FIG. 8, in operation 801, the base station calculates a communication capacity of each terminal group.

The communication capacity for each terminal group may be calculated by a product between Tx power distributed to the terminal group and a channel gain constant, based on a case where Tx power is uniformly distributed by $P_t/N$ to each group.

In operation 803, the base station determines whether the overall communication capacity of the communication system is greatest. Whether the overall system communication capacity is greatest is determined based on the communication capacity calculated in operation 801, and if the overall communication capacity of the communication system is not greatest, the base station adjusts Tx power distributed to the terminal group (see 805).

In operation 805, the base station adjusts the Tx power distributed to the terminal group. For example, the base station may adjust the Tx power according to a water-filling scheme. The water-filling scheme uses an iterative algorithm for estimating and updating a general height to find an exact height which satisfies a total power limit. The water-filling scheme allocates more power to sub-channels with a good condition (e.g., a high Signal Noise Ratio (SNR)) and allocates less power or no power to channels with a poor condition, thereby increasing a transfer rate of the sub-channels with the good condition, and consequently allowing the total transfer rate to be close to the channel capacity. If the overall communication capacity of the communication system is not greatest, the base station adjusts Tx power distributed to each terminal group, thereby improving the overall communication capacity.

As an embodiment for the method of adjusting Tx power distributed to the terminal group, the base station can operate with a method described below.

In this method, a communication capacity is calculated based on a case where Tx power is uniformly distributed to a terminal group by $P_t/N$. In this case, a communication capacity $R_i^{NOMA}$ for each terminal group may be determined as shown in Equation 12.

$$R_i^{NOMA} = p_i g_i \qquad \text{Equation 12}$$

In Equation 12, $R_i^{NOMA}$ denotes a communication capacity for each terminal group, $p_i$ denotes Tx power distributed to each terminal group, and $g_i$ denotes a channel gain constant. The channel gain constant $g_i$ may be determined as shown in Equation 13 below.

$$g_i = \frac{\sum_{k=1}^{K} \log_2(1 + \gamma_{i,k})}{\sum_{k=1}^{K} p_{i,k}} \qquad \text{Equation 13}$$

In Equation 13, $p_{i,k}$ denotes Tx power for a terminal k belonging to a terminal group i, $g_i$ denotes a channel gain constant, K denotes the number of terminals belonging to the terminal group, and $y_{i,k}$ denotes a Signal to Noise Ratio (SNR). In Equation 13, a denominator may imply a sum of Tx power distributed to all terminals in the terminal group, and a value thereof may vary in a repeated power allocation process. In Equation 14, a numerator may imply a communication capacity for each terminal group.

As an unlimited embodiment, in the presence of 3 terminal groups, $g_1$, $g_2$, $g_3$ may be calculated by dividing communication capacities $R_1^{NOMA}$, $R_2^{NOMA}$, $R_3^{NOMA}$ calculated by using Tx power of $P_t/N$ by an amount of power distributed to each terminal group. In Equation 3, $y_{i,k}$ may be determined as shown in Equation 14.

$$\gamma_{i,k} = \frac{p_{i,k}|h_{i,k}^H v_i|^2}{\sigma^2} \qquad \text{Equation 14}$$

In Equation 14, $y_{i,k}$ may denote Tx power for the terminal k belonging to the terminal group i, $h_{i,k}^H$ may denote a channel between the base station and the terminal k belonging to the terminal group i, $v_i$ may denote a Tx beamforming vector, and $\sigma^2$ may denote noise power.

A method of adjusting Tx power distributed to each terminal group by using a water-filling scheme may be determined as shown in Equation 15.

$$\frac{p_i}{p_t} = \begin{cases} \frac{1}{g_0} - \frac{1}{g_i} & \text{if } g_i \geq g_0 \\ 0 & \text{if } g_i < g_0 \end{cases} \qquad \text{Equation 15}$$

In Equation 15, $p_i$ denotes Tx power distributed to the terminal group, $p_t$ denotes Tx power of the base station, $g_i$ denotes a channel gain constant, and $g_0$ denotes a water-level. $g_0$ may be determined as shown in Equation 16.

$$\sum_{i=1}^{N} \left( \frac{1}{g_0} - \frac{1}{g_i} \right) = 1 \qquad \text{Equation 16}$$

In Equation 16, $g_i$ denotes a channel gain constant, and $g_0$ denotes a water-level.

With the above method, the base station adjusts TX power in such a manner that the calculated Tx power is re-distributed to each terminal group.

Figure 9:
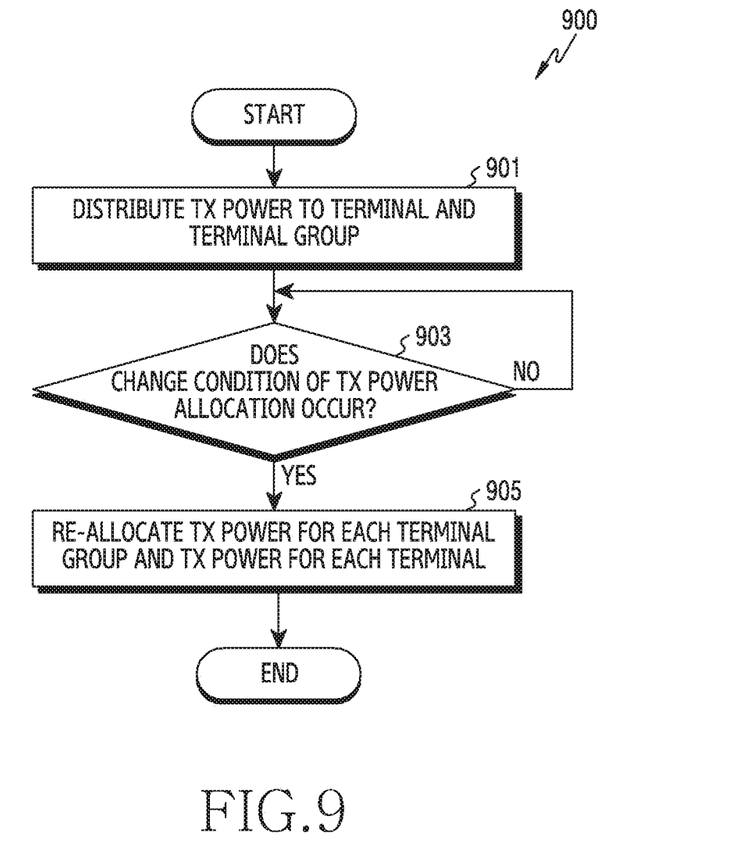
FIG. 9 illustrates a flowchart for re-allocating Tx power for a terminal group and a terminal in a wireless communication system according to an embodiment of the disclosure.

FIG. 9 illustrates a flowchart 900 for re-allocating Tx power for a terminal group and a terminal in a wireless communication system according to an embodiment of the disclosure. A method of operating the base station 110 is exemplified in FIG. 9.

Referring to FIG. 9, in operation 901, the base station distributes Tx power to a terminal and a terminal group. This concept includes the processes disclosed in FIG. 6, i.e., the process 605 of allocating power to terminals in a terminal group and the process 607 of adjusting Tx power distributed to each terminal group. It is premised that Tx power is distributed to an objective terminal and a terminal group including the objective terminal.

In operation 903, the base station determines whether a change condition of Tx power allocation occurs. If the change condition is satisfied, the base station may re-allocate Tx power for each terminal group and Tx power for each terminal. The change condition can be randomly configured by an operator such as a business operator or an administrator. Otherwise, if the change condition is not satisfied, the base station waits for the occurrence of the change condition.

In operation 905, the base station re-allocates the Tx power for each terminal group and Tx power for each terminal. The base station re-distributes Tx power by repeating the process 605 of allocating power to terminals in the terminal group and the process 607 of adjusting Tx power distributed to each terminal group if the change condition of Tx power allocation occurs.

In the embodiment described with reference to FIG. 9, the change condition determined by the base station may be defined according to the following policy. The scope of the disclosure is not limited to the described embodiment.

For example, the base station may perform power allocation every pre-set time. The base station may perform power allocation at a time designated by an operator, and the time may vary depending on an intention of the operator.

Power allocation may be performed for each terminal when the objective terminal is changed.

The base station may perform power allocation if a change in a communication throughput in the terminal group is greater than or equal to 10% due to a rapid movement of the terminal in the terminal group. A value of the change may vary depending on an intention of the operator.

According to the aforementioned various embodiments, Tx power is distributed so that a communication capacity of the objective terminal is greatest while maintaining Quality of Service (QoS) in each terminal group on the basis of the location information of the terminal in the wireless communication system, thereby decreasing waste of Tx power.

Methods based on the embodiments disclosed in the claims and/or specification of the disclosure can be implemented in hardware, software, or a combination of both.

When implemented in software, computer readable recording medium for storing one or more programs (i.e., software modules) can be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the disclosure.

The program (i.e., the software module or software) can be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program can be stored in a memory configured in combination of all or some of these storage media. In addition, the configured memory can be plural in number.

Further, the program can be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device can have an access to a device for performing an embodiment of the disclosure via an external port. In addition, an additional storage device on a communication network can have an access to the device for performing the embodiment of the disclosure.

In the aforementioned specific embodiments of the disclosure, a component included in the disclosure is expressed in a singular or plural form according to the specific example embodiment proposed herein. However, the singular or plural expression is selected properly for a situation proposed for the convenience of explanation, and thus the various embodiments of the disclosure are not limited to a single or a plurality of components. Therefore, a component expressed in a plural form can also be expressed in a singular form, or vice versa.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a base station in a wireless communication system, the method comprising:
   receiving location information of terminals;
   determining pre-defined terminal group beams to classify the terminals;
   classifying the terminals into a terminal group based on location information of the terminals;
   allocating transmit (Tx) power to an objective terminal and the other terminals in the terminal group based on the location information of the terminals;
   adjusting the Tx power allocated to the terminal group; and
   transmitting the allocated Tx power to the terminals,
   wherein the objective terminal has a top priority in Tx power allocation.

2. The method of claim 1, wherein the classifying of the terminals into the terminal group comprises comparing the location information of the terminals and an angle of a beam of the pre-defined terminal group beams.

3. The method of claim 1, wherein the allocating of the Tx power to the terminals in the terminal group comprises:
   selecting the objective terminal;
   distributing Tx power to the other terminals in the terminal group based on a channel capacity to be satisfied when the Tx power is distributed using an orthogonal multiple access scheme; and
   distributing, to the objective terminal, the remaining Tx power except for the Tx power distributed to the other terminals, from the Tx power allocated to the terminal group.

4. The method of claim 3, wherein the distributing of the Tx power to the other terminals in the terminal group comprises uniformly distributing the Tx power to a terminal farthest in distance from the base station based on the channel capacity to be satisfied when the Tx power is distributed using the orthogonal multiple access scheme.

5. The method of claim 1, wherein the adjusting of the Tx power allocated to the terminal group comprises:
   calculating a communication capacity based on a case where the Tx power is uniformly distributed to terminal groups; and
   allocating the Tx power to each terminal group based on a water-filling scheme for amplifying up to a required power level based on the calculated communication capacity for each terminal group.

6. The method of claim 1, further comprising:
   allocating Tx power to the terminals in the terminal group based on location information of the terminals on the basis of the adjusted Tx power; and
   adjusting the Tx power allocated to the terminal group.

7. The method of claim 1, further comprising determining whether to further allocate the Tx power and adjust the Tx power.

8. A base station in a wireless communication system, the base station comprises:
   at least one transceiver; and
   at least one processor operably coupled to the at least one transceiver,
   wherein the at least one processor is configured to:
   receive location information of terminals,
   determine pre-defined terminal group beams to classify the terminals, classify the terminals into a terminal group based on the location information of the terminals, allocate transmit (Tx) power to an objective terminal and the other terminals in the terminal group based on the location information of the terminals, adjust the Tx power allocated to the terminal group, and transmit the allocated Tx power to the terminals, wherein the objective terminal has a top priority in Tx power allocation.

9. The base station of claim 8, wherein the at least one processor is further configured to compare the location information of the terminals and an angle of a beam of the pre-defined terminal group beams.

10. The base station of claim 8, wherein the at least one processor is further configured to:

select the objective terminal in the terminal group, distribute Tx power to the other terminals in the terminal group on the basis of a channel capacity to be satisfied when the Tx power is distributed using an orthogonal multiple access scheme, and distribute, to the objective terminal, the remaining Tx power except for the Tx power distributed to the other terminals, from the Tx power allocated to the terminal group.

11. The base station of claim 10, wherein the at least one processor is further configured to, in order to distribute the Tx power to the other terminals in the terminal group, uniformly distribute the Tx power to a terminal farthest in distance from the base station on the basis of the channel capacity to be satisfied when the Tx power is distributed using the orthogonal multiple access scheme.

12. The base station of claim 8, wherein the at least one processor is further configured to:

calculate a communication capacity based on a case where the Tx power is uniformly distributed to terminal groups, and distribute the Tx power to each terminal group based on a water-filling scheme for amplifying up to a required power level based on the calculated communication capacity for each terminal group.

13. The base station of claim 8, wherein the at least one processor is further configured to:

allocate Tx power to the terminals in the terminal group based on location information of the terminals on the basis of the adjusted Tx power, and adjust the Tx power distributed to the terminal group.

14. The base station of claim 8, wherein the at least one processor is further configured to determine whether to further comprise allocating the Tx power and adjusting the Tx power.

15. The base station of claim 8, wherein the at least one processor is further configured to:

determine whether a change condition of Tx power allocation occurs, and in response to a determination that the change condition has occurred, allocate Tx power for each terminal in each terminal group.

16. The base station of claim 15, wherein the change condition occurs at a pre-set time.

17. The base station of claim 15, wherein the change condition occurs when the objective terminal changes.

18. The base station of claim 15, wherein the change condition occurs when a change in communication throughput in the terminal group exceeds 10%.

19. The method of claim 1, further comprising:

determining whether a change condition of Tx power allocation occurs, and in response to a determination that the change condition has occurred, allocating Tx power for each terminal in each terminal group.

20. The method of claim 19, wherein the change condition occurs at a pre-set time.

* * * * *